United States Patent
Apariclo et al.

(10) Patent No.: US 6,286,846 B1
(45) Date of Patent: Sep. 11, 2001

(54) DUAL INPUT SUSPENSION SYSTEM USING A COMMON SPRING/SHOCK-ABSORBER DEVICE

(75) Inventors: Leonardo Enrique Maximo Apariclo; Leandro Martin Meglio, both of Mar del Plata (AR)

(73) Assignees: Santiago Adrian Urguiza; Martin Esteban Goni, both of Mar del Plata (AR)

( * ) Notice: Subject to any disclaimer, the term of this patent is extended or adjusted under 35 U.S.C. 154(b) by 0 days.

(21) Appl. No.: 09/411,669

(22) Filed: Oct. 4, 1999

(30) Foreign Application Priority Data

Oct. 5, 1998 (AR) .......................................... AR P9801043

(51) Int. Cl.$^7$ ..................................................... B60G 1/04
(52) U.S. Cl. ...................................... 280/124.11; 280/283
(58) Field of Search ..................... 280/124.103, 124.106, 280/124.109, 124.11, 124.134, 124.135, 124.136, 283

(56) References Cited

U.S. PATENT DOCUMENTS

| | | |
|---|---|---|
| 2,128,660 | 8/1938 | Moorhouse . |
| 2,314,076 | 3/1943 | Casner . |
| 3,089,710 | 5/1963 | Fiala . |
| 4,058,181 * | 11/1977 | Buell ........................ 180/32 |
| 4,265,329 | 5/1981 | de Cortanze . |
| 4,360,224 * | 11/1982 | Sato et al. ................ 280/772 |
| 4,378,741 | 4/1983 | Nagahori . |
| 4,542,910 | 9/1985 | Watanabe . |
| 4,583,612 | 4/1986 | Parker . |
| 4,627,632 | 12/1986 | McKagen . |
| 4,676,523 | 6/1987 | Rogers . |
| 4,712,638 | 12/1987 | Kawaguchi et al. . |
| 4,998,596 * | 3/1991 | Miksitz ................. 180/213 |
| 5,108,127 * | 4/1992 | Chandler ................ 280/675 |
| 5,330,219 | 7/1994 | Groendal et al. . |
| 5,417,445 | 5/1995 | Smart . |
| 5,452,910 | 9/1995 | Harris . |
| 5,498,013 * | 3/1996 | Hwang .................. 280/283 |
| 5,498,014 | 3/1996 | Kulhawik et al. . |
| 5,685,553 | 11/1997 | Wilcox et al. . |
| 5,725,227 | 3/1998 | Mayer . |
| 5,765,846 * | 6/1998 | Braun .................. 280/112.2 |
| 5,772,227 | 6/1998 | Michail . |
| 5,785,339 | 7/1998 | Mamiya et al. . |
| 5,791,674 | 8/1998 | D'Aluisio et al. . |
| 5,941,542 * | 8/1999 | Kalman .................. 280/38 |
| 5,957,473 * | 9/1999 | Lawwill ................ 280/284 |
| 5,961,135 * | 10/1999 | Smock ................ 280/124.11 |

FOREIGN PATENT DOCUMENTS

| | | |
|---|---|---|
| 611982 | 7/1933 | (DE) . |
| 4326870 | 3/1994 | (DE) . |
| 0258509 | 3/1988 | (EP) . |
| 1008870 | 5/1952 | (FR) . |
| 2298693 | 9/1996 | (GB) . |
| 2332402 | 6/1999 | (GB) . |
| 09002042 | 1/1997 | (JP) . |
| 03231010 | 10/1997 | (JP) . |
| WO9505948 | 3/1995 | (WO) . |
| WO9525020 | 9/1995 | (WO) . |

* cited by examiner

*Primary Examiner*—Brian L. Johnson
*Assistant Examiner*—Daniel Yeagley
(74) *Attorney, Agent, or Firm*—Godfrey & Kahn, S.C.

(57) ABSTRACT

A suspension system for isolating a load (L) independently from two separate inputs ($I_A$, $I_B$), such as a pair of wheels. A slider (19) is slidably mounted to a frame member (11) supporting the load and pivotable supports a common swing-arm (23). Each end of the common swing-arm is coupled to corresponding input swing-arms by a linkage assembly (24) comprising a pair of link-arms (25A, 25B) in a manner that an input disturbance will be transferred by the corresponding input swing-arm to its link-arm which will cause a positive translation and rotation movement of the the common swing-arm relative to the the frame member, such that the common swing-arm will pivot a certain degree about the other link-arm but without substantially moving the latter, thereby maintaining the undisturbed input independent from the disturbed input. The suspension system may be applied to bicycles, motor-cycles, automobile axles and rolling vehicles in general.

21 Claims, 5 Drawing Sheets

DUAL INPUT SUSPENSION SYSTEM USING A COMMON SPRING/SHOCK-ABSORBER DEVICE

FIELD OF THE INVENTION

The present invention generally refers to a suspension system wherein two inputs are applied to a common load suspension device. In particular, the system of the invention may be applied to land vehicles; more particularly to bicycles, motor-cycles and automobiles.

In the case of two-wheeled vehicles, such as bicycles and motor-cycles in particular, the suspension system may serve to isolate the seat and handlebars from each of the front or back wheels. In a four-wheel vehicle, the system may be applied to either or both the front and/or rear axles or to the left- and right-hand side pairs of wheels.

The shock-absorber function, within the context of the present invention, is related to dampening movement transmitted from a movable part to another part supported thereon or otherwise connected thereto. Likewise, the function of the spring is to maintain support of the movable part at a predetermined height or distance from the other part, by resiliently restoring the movable part back to its original placement once the external force causing movement thereof has ceased.

BACKGOUND OF THE INVENTION

Vehicles generally have separate suspension devices comprising springs or springs and shock absorbers in combination, for each wheel or axle end. Such devices are technically well developed and relatively costly. In lightweight vehicles requiring suspension, such as in mountain bicycles for instance, the weight of the suspension device is also a relevant factor.

Some automobile vehicles use common interliked resilient devices, however for design purposes each half-spring is considered as a separate resilient element pertinent to a separate wheel or wheel system. Such separate devices are even more apparent in two-wheel vehicles. Most motor-cycles and some bicycles supplied with full suspension means use a wheel suspension system provided with a telescopically coupled sliding tube and a fork leg forming a suspension assembly with a shock absorber assembly. The size of the conventional tube/fork system requires overdimensioning to resist strong shocks which tend to bend the arrangement. Another consideration is that the optimum angle of direction does not coincide with the optimum angle of operation.

U.S. Pat. Nos. 4,265,329 and 4,627,632 suggest articulated systems that purport to overcome these problems. Further solutions are disclosed in U.S. Pat. Nos. 4,542,910 and 4,712,638 wherein a progressive linkage mechanism is incorporated between the frame structure of the vehicle and the swing arm which provides a point of progressive movement relative to the movement of the swing arm. A cushion member is coupled at such a point rather than directly to the swing arm to obtain an advantageous response relationship to movement of the swing arm. In this way, the vehicle provides a more comfortable or pleasing ride on a wider range of road conditions while maintaining a low weight. There is also in the art a wide range of simple and complex suspension systems for the back wheel.

Pedalling is the cause of a further problem in the case of bicycles. Many rear suspension are made with the pivot point at the same height as the rear wheel axle and/or about the crank assembly center. As soon as the rear axle goes above the pivot point, the chain force tends to pull the suspension into further compression. This exaggerates the suspension and creates a sagging effect that can be felt when pedalling. Furthermore, there is a loss of pedalling energy. To overcome these problems, the pivot point of many suspension units have been raised above the front chain ring. By doing this, the sag effect and the pull on the suspension is reduced or eliminated, such as suggested in U.S. Pat. No. 5,725,227 or in U.S. Pat. No. 5,685,553.

Another problem associated with this type of suspension is that the swing arm is parallel to the ground. When the rear wheel hits a bump, the resultant force is generally at a 15° to 20° angle to the ground. Thus, a substantial portion of the resultant force pulls on the swing arm and slows the rider down. In these systems, the resultant force on the rear wheel from hitting a bump is more perpendicular to the swing arm. This reduces the backward pull on the swing arm and the bicycle. However, during the compression travel of the rear wheel, these suspension systems tend to force the rear wheel in a backward direction which applies tension on the chain. Thus, the chain tension hinders the movement of the suspension, particularly at the upper end of the compression travel. U.S. Pat. Nos. 5,791,674 and 5,452,910 disclose articulated systems wherein the rear swing arm trasero does not follow a circular path through a pivot, thereby reducing forces transmitted to the frame by pot-holes and reducing the ziz-zag effect caused by pedalling. This eefect is also addressed by U.S. Pat. No. 5,785,339 which discloses a more complex system.

This brings us to the desire to simplify suspension systems by using a common resilient restoration and shock absorber for both wheels, as suggested in U.S. Pat. Nos. 5,498,014, 5,330,219, 5,772,227 and 5,417,445, as well as in U.S. Pat. Nos. 4,583,612 and 4,378,741 using different suspension device elements. However, in all these cases, the uses of a single suspension device common to both separate inputs causes cross-effects from each input to the other, therefore the inputs in such patented systems may not be considered independent of each other.

SUMMARY OF THE INVENTION

Therefore, an object of the present invention is to provide a suspension system wherein two separate input nodes may be independently coupled to a vehicle frame using a single suspension device.

Another object of the present invention is a system for use in a two-wheel vehicle or cycle for providing front and rear wheel suspension to the cycle frame by means of a single spring means, with or without complementary shock absorbing means.

A further object of the present invention is a system for use in a multiple two-wheel axle vehicle for providing independent suspension for each wheel of an axle thereof to a vehicle chassis or body through a common spring and shock absorber means.

Yet a further object of the invention is to provide a simpler and more economical suspension system.

The suspension system of the invention generally comprises a frame member to which a pair of separate input nodes are pivotable connected such as by means of a pair of input swing-arms. The frame member forms part of a generally static load system which includes the means accomodating the vehicle passengers in transit. According to the present invention, the suspension system further comprises a common swing-arm pivoting on a slider mounted to said frame member, such that the swing-arm may pivot and translate in a predetermined direction in relation to the frame member. The slider is coupled to the frame member by means of a suspension device which may include a resilient member or a resilient/shock absorber combination. The swing-arm includes two further pivots on each side of the slider pivot for coupling respective link arms to each of said nodes in a configuration such that an external force disturbing one of said nodes causes the common swing-arm to tilt substantially about the link-arm pivot corresponding to the other, undisturbed node, thereby urging the slider against the suspension device. The mechanism essentially formed by the link arms, the common swing arm and the slider provides substantially independent suspension between the frame member and each of the input nodes.

The present invention further identifies two inherently stable link arm configurations in particular. In a first embodiment, the slider is located on the frame arm above the pivot connections between the frame arm and the pair of input swing-arms. In this embodiment, the link-arms may cross-over to connect each node to the opposite end of the common swing-arm. In a second embodiment, the slider is located on the frame arm below the pivot connections between the frame arm and the pair of input swing-arms. In this second embodiment, the link-arms connect each node to the end of the common swing-arm on the same side of the frame member as the node. Thus, a condition for unaided stability is that the link-arm configuration be such that a positive (upward) disturbance at one node tends to reduce the angle between the driven link-arm and the common swing-arm, i.e. urges the common swing-arm to align with the driven link-arm.

The present invetion is, inter alia, applicable to two-wheel vehicles or cycles wherein the frame member supports the seat. The front and back wheel axles may be considered as the input nodes. In a preferred embodiment, the fork mounting the back wheel axle is adapted as a rear input swing-arm directly pivoted to the frame member. The front fork is generally rigidly connected to the second input swing-arm, the rear end of which is pivotably connected to the rear swing-arm/fork. In this preferred embodiment, the handlebar of the vehicle is not rigidly attached to the front wheel fork as in conventional bicycles and motor-cycles but is connected to the seat.

BRIEF DISCRIPTION OF THE DRAWINGS

These and other features, advantages and details of this invention and how it may be reduced to practice may be better understood from the ensuing detailed description, by way of example and by no means limiting, of exemplary embodiments represented in the appended drawings, wherein.

DETAILED DESCRIPTION OF PREFERRED EMBODIMENTS

Figure 1:
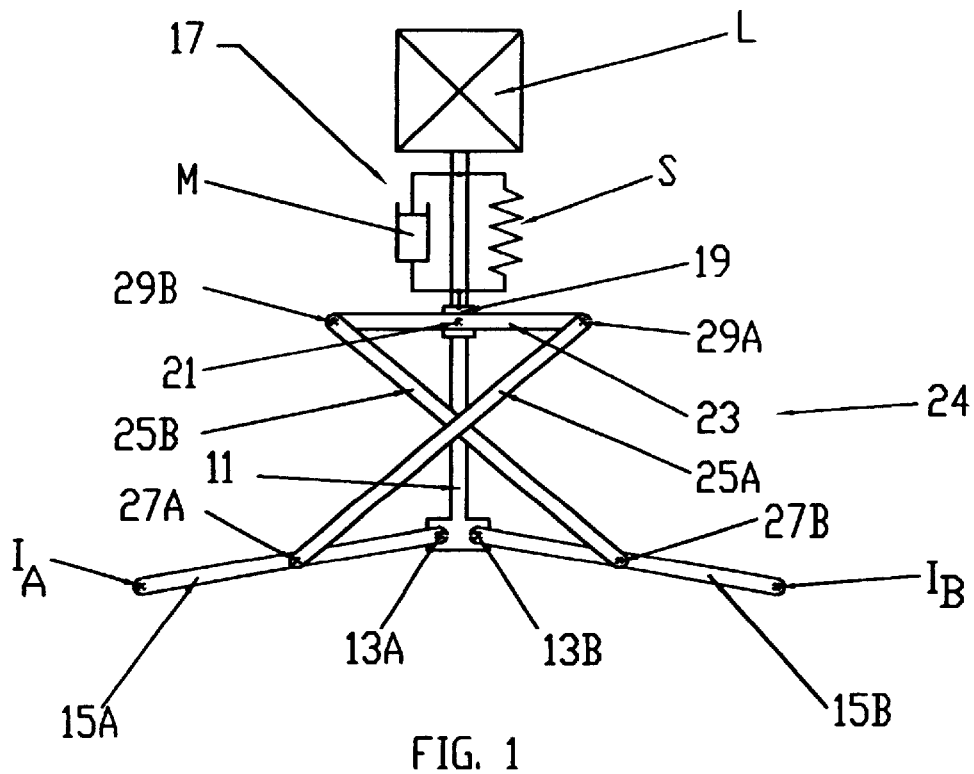
FIG. 1 is a schematical representation of the suspension system according to a first embodiment of the present invention, illustrated in an unloaded state.

A first embodiment of the suspension system is shown in FIG. 1 in a relative unloaded state. A load L requiring independent suspension from two separate inputs $I_A$ and $I_B$ is supported by a reference frame member 11. The load L may comprise a plurality of discrete components and may be rigidly attached to the frame member. Moreover, merely for convenienced purposes, the load L appears in a centred on the frame member 11 however, as will usually be the case in practice, the load L may alternatively be eccentric relative to the frame member.

A pair of pivots 13A and 13B at the bottom end of the frame member 11 connect the latter to a pair of input swing-arms 15A and 15B the free ends of which incorporate the input nodes $I_A$ and $I_B$. Although the input nodes I are depicted in the drawings at a certain point on their associated swing-arm 15 (alphabetical suffices A, B are often omitted herein when generalizing), the input I may be applied at any point or distributed over multiple points of the input swing-arm 15 spaced from the frame pivot 13.

Moreover, two separate pivot connections the pivot 13A and 13B are shown in the drawings, however they may be combined into a single triple-pivot connections. Alternatively, as further apparent from the disclosure hereinafter, the connection of a input swing-arm 15 to the frame member 11 need not necessarily be direct.

The term "bottom" is used herein in a relative sense consistent with the preferred vehicle applications of the invention described hereinafter. Thus, a "positive" disturbance force applied to any one of said nodes $I_A$ or $I_B$ is assumed to have a component in the "upward" direction. Nonetheless, although the suspension system of the invention is disclosed lying generally in an ideal vertical plane, the system may lie eventually in a horizontal plane according to a particular application requirement, hence the use of the "positive" rather than upward. Naturally, in these vehicle embodiments, computer simulation has shown that the inputs may be briefly negative (such as going down a step), however the magnitudes thereof are smaller compared to the positive inputs and have no substantial impact on design considerations.

The frame member 11 is attached to one side of a suspension device 17 including a resilient component or spring S. Preferably, a shock absorber M is added in combination, e.g. in parallel, to the spring S. Both componentes S and M may be of conventional design.

The other, movable side of the suspension device 17 is attached to a slider 19 slidably mounted to the frame member 11. The slider 19 features a pivot 21 to which a swing-arm 23 is mounted, such that the swing-arm 23 may slide up and down the frame member 11 and rotate about this locus. The slider the slider 19 is driven in this manner by a linkage system 24 according to the invention comprising a pair of link-arms the link-arm 25 arranged as depicted in FIG. 1. In particular, there is one link-arm 25A with pivot connections 27A, 29B at each end coupling one of the swing-arms 15, or nodes I for that matter, to the opposite end of the swing-arm 23. Likewise, the other link-arm 25B has a pivot connection 27B to the swing-arm 15B and another pivot connection to the common swing-arm 23.

Although the frame member 11 is depicted as a bar-shaped member, it is in no way restricted to this shape and may have a different shape as required by a specific application. For instance, the slider function may be embodied by an elongated hole formed in a plate-shape frame member to hold central pivot means 21.

Figure 2A:
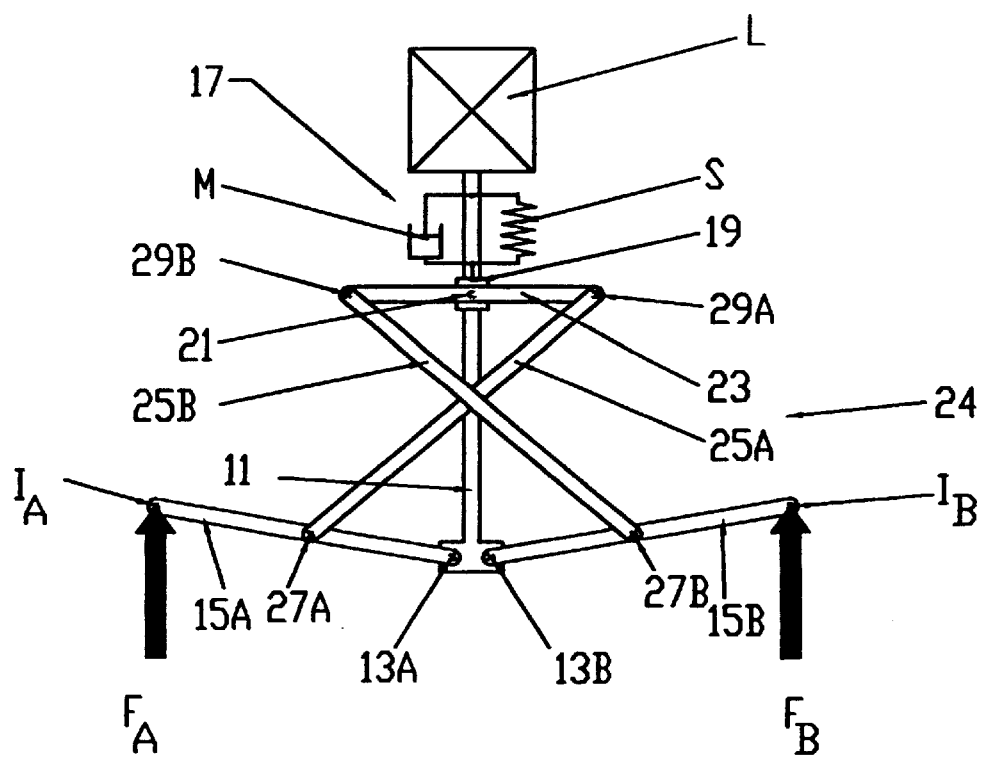
FIGS. 2A and 2B are schematical representations of the suspension system of FIG. 1 responding to a balanced input state, i.e wherein both the input nodes are subjected to respective external input forces of like magnitude and direction.

The suspension system adopts the position shown in FIG. 1 in an unloaded state, i.e. when $I_A=I_B=0$ (relative) is steady. FIG. 2A illustrates the system response to a balanced input applied at both nodes $I_A$ and $I_B$ simultaneously. The upward movement of the input swing-arms caused by the positive application of external disturbances $F_A=F_B\neq 0$ is transferred by the link-arms 25 to the swing-arm 15. Each link arm the link-arm 25 applies on the corresponding end of the common swing-arm 23 a vertical force component directed upwards and a vertical force component directed inwards, i.e. towards the central pivot 21. The symmetrical vertical components from each link-arm the link-arm 25 cancel each other out therby resulting in double upward resultant force on the slider 19 and a torque on the common swing-arm 23. The torques are of opposite signs thereby cancelling out, such that the common swing-arm 23 does not rotate but is driven by the sum of the positive forces, thereby pushing the slider 19 upwards along the frame member locus to compress the suspension device the suspension device 17 a distance X. The normal position (FIG. 1) is restored when the spring S is compressed sufficiently to return a force $F_S=kX$ equal said sum, i.e. when the spring compression $X=2F_A/k$. The overall effect (i.e. vibration amplitude, frequency and decay) on the load L, and the amount of spring compression X, depend mainly on the magnitude and duration of the input disturbance and the load (including the frame) weight and inertia.

Figure 2B:
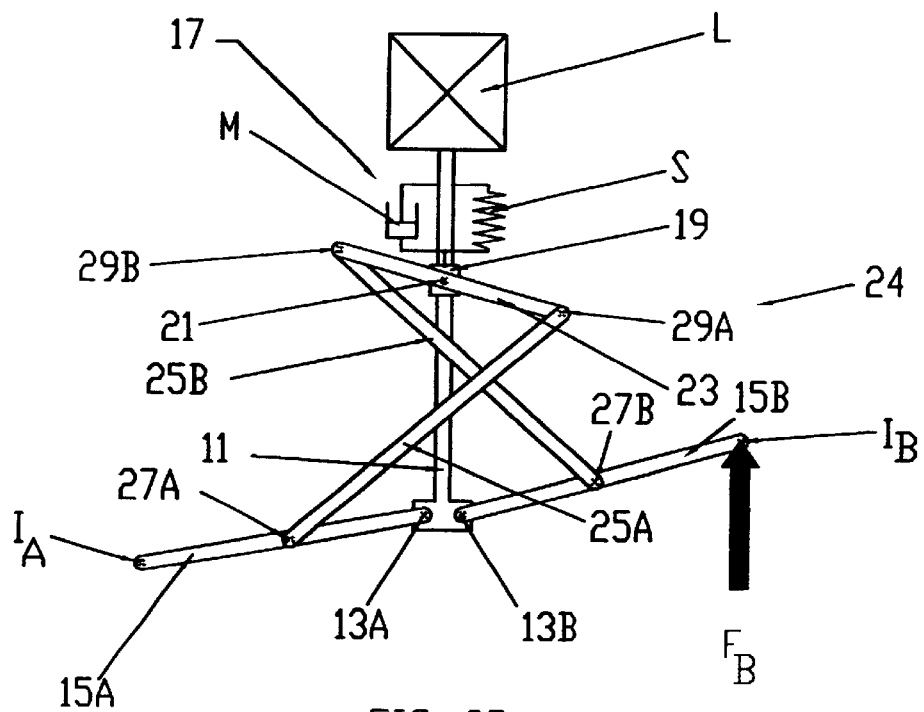

Of particular interest is the response to an unbalanced dual input, since this represents a frequent if not constant situation in practice and concerns a primary object of the invention. As illustrated in FIG. 2B, one of the nodes $I_B$ is subjected to a positive disturbance $F_B\neq F_A$. The swing-arm 15B pivots upwards and, through rigid link-arm the link-arm 25B, pushes the opposite side common swing-arm 23, causing the latter to rotate since there is no countertorque on the other end thereof. The common swing-arm 23 rotates in a direction which tends to align it with the driving link-arm 25B. As the angle between the common swing-arm 23 and the link-arm 25B diminishes due to the rotation, the tangential component generating the torque on the former diminishes until the torque is matched by a countertorque which the restoring force transmitted from the suspension device 17 applies to the common swing-arm 23 via the central pivot 21, whereby the arm 23 stops tilting. The system therafter reacts to restore to the normal position.

Actually, the common swing-arm 23 substantially rotates on the pivot 29A at its opposite end, thereby dragging the slider 19 upwards and urging the required reaction from the suspension device the suspension device 17 to cushion the effect of the input $F_B$ on the load and and restore the normal position thereof. In fact, there is hardly any noticeable movement on the undisturbed link-arm 25A and swing-arm 15A side, except generally negligible movement coming from the frame member 11 shifting upwards slightly.

This is one of the primary advantages of the system of the invention and may be interpreted in that the undisturbed pivot connection 29A is practically in the same relative position in FIGS. 1 and 2A. Thus the undisturbed input node $I_A$ is substantially independent from disturbaions applied at the opposite input node IB, and vice versa of course. In the case of composite disturbances $0<F_B\neq F_A>0$, the linkage system 24 responds independently to each input I and the dynamics of the suspension device 17 are simply a composition of the responses of FIGS. 2A and 2B.

Figure 3:
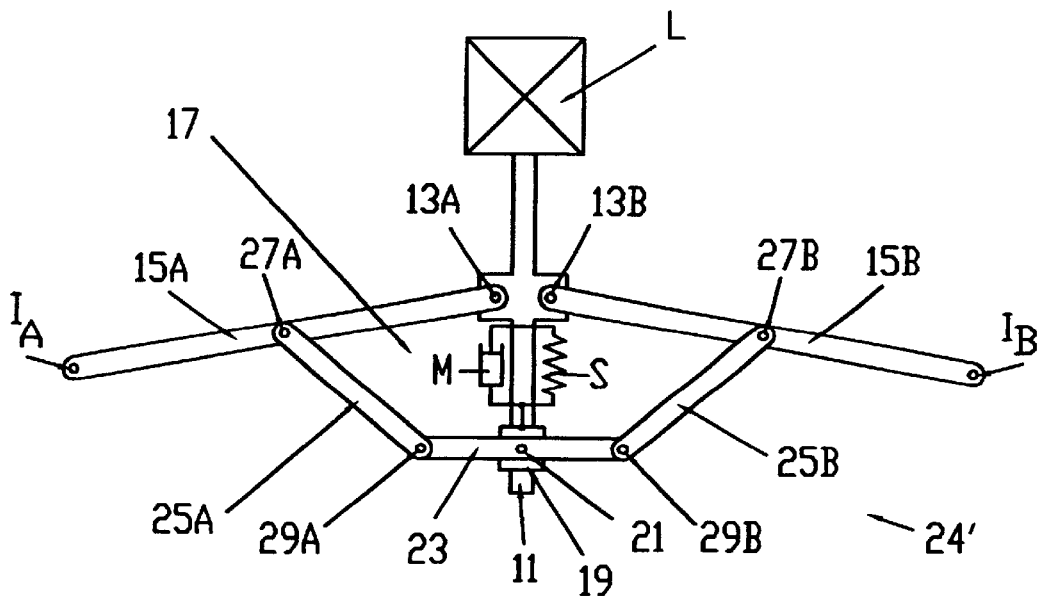
FIG. 3 is a schematical representation of the suspension system according to a second embodiment of the present invention, illustrated in an unloaded state.

For some applications it may be desirable to locate the suspension device 17 and the common swing-arm 23 underneath the input swing-arms 15. FIG. 3 illustrates an alternative embodiment useful for such applications. The slider 19 is located on the bottom part of the frame member 11 and a different linkage arrangement 24' is required to ensure an inherent stable suspension system. The stability condition may be expressed as that the link-arms 25 should be arranged such that, in response to an external disturbance at one of the nodes I, the common swing-arm 23 tends to align itself, or close the angle, with the disturbed link-arm 25. To satisfy this condition, each link-arm should be connected to the end of the common swing-arm 23 on the same side of the associated input swing-arm 15 relative to the frame member 11.

If a linkage arrangement not meeting this condition is used, the system would tend to destabilize under disturbance, thereby requiring additional components to avoid the common swing-arm 23 from flipping over.

Reference is made hereinafter to particular applications of the suspension systems described hereinabove. Like reference numerals are used in FIGS. 4 and 5A–5B to identify equivalent components relative to the systems of FIGS. 1 or 3.

Figure 4:
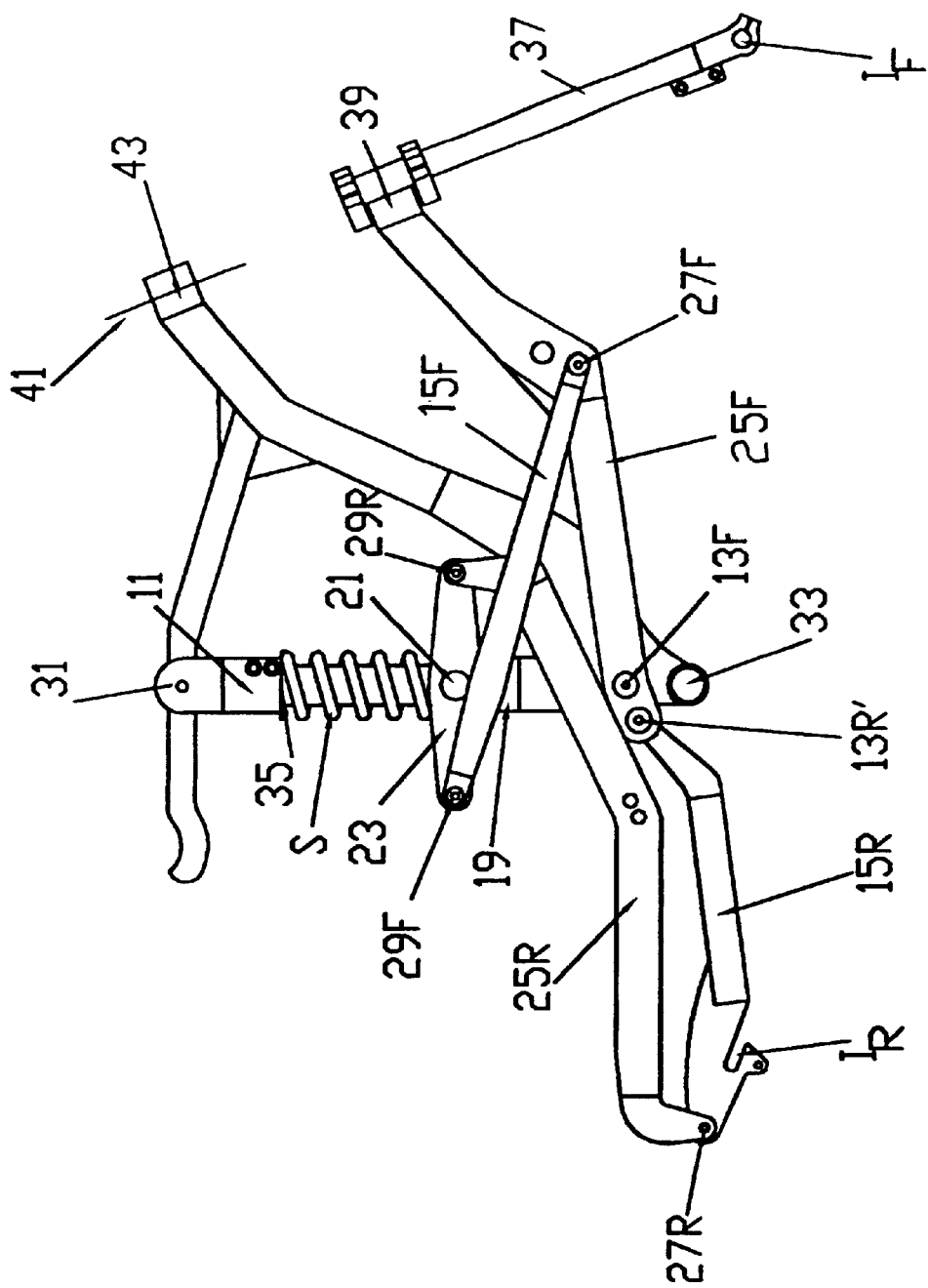
FIG. 4 is a schematic representaton of a suspension system similar to FIG. 1 adapted to the frame of a two-wheel vehicle, such as a bicycle or a motor-cycle.

FIG. 4 refers to a particular application of the suspension system of the invention to a bicycle or motor-cycle. For ease of illustration and clarity, only the relevant parts of the cycle are represented. The cycle comprises a frame member the frame member 11 including means 31 for supporting a seat on top and, in the case of a bicycle, means 33 below for holding the pedals. A slider 19 is mounted to the frame member 11 and a spring S between the slider 19 and an upper stop 35 on the frame member 11.

A front fork 37 is conventionally adapted to hold a wheel and is retained inside a tubular housing 39 allowing the wheel to turn sideways by means of handlebars 41 (represented schematically in FIG. 4), further reference to which is made hereinafter. The fork housing 39 is rigidly attached to a front swing-arm member 15F such that disturbances returned by the front wheel (the axle of which may be considered as one of the input nodes $I_F$) are transferred directly to the arm 15F. The rear swing-arm 15R is formed by the back-wheel fork (again, the back-wheel axle may be considered as the other input node $I_R$).

The front fork 15F is connected via pivot 13R near the bottom end of the frame member 11. The pivot connection between the rear swing-arm 15R is carried out indirectly, by pivoting the front end thereof on the back end of the front swing-arm 15R at a point 13R' spaced backwards from the front swing-arm/frame member pivot 13F. It has been found that this coupling 13R' of the rear fork 15R on the front swing-arm 15F assists cycle stability when travelling up and down inclined terrain.

As in FIG. 1, a central swing-arm the common swing-arm 23 is mounted on the slider 19 and coupled to the front and rear swing-arms 15 by means of a pair of link-arms 25F and 25R via pivots 27F–29F and 27R–29R, respectively. In the cycle embodiment, the central swing-arm the common swing-arm 23 and the link-arms 25 are actually formed by a pair of bars affixed side-by-side to each other and arranged symmetrically on both sides of the plane of the frame member 11. Although shapes may vary, the shaped of the arms the input swing-arms 15 and the link-arms 25 shown in FIG. 4 are particularly designed to avoid movement of the system in operation from interfering with the normal cycle movements. In one embodiment, each arm 15 and 25 comprises a pair of tubular members made of aluminium alloy and soldered to cross joining members (not illustrated). However, other materials may be used, such as carbon fiber in epoxy resin, titanium alloy, etc.

Although the suspension system is shown in FIG. 1 comprising symmetrical components of the same length, the embodiment of FIG. 3 also shows that there is no constraint in this respect. That is, the input swing-arms 15 and the link-arms 25 may be of equal or substantially different lengths, according to specific design considerations.

Tests carried out on a bicycle embodied as in FIG. 4 showed that the suspension responded as expected from a computer simulation carried out on the suspension model of FIG. 1. The front and back wheels were felt to independently copy (i.e. adhere to) the terrain going up and down steps. Visual analysis of video images filmed during these tests confirmed these feelings of the driver on the seat.

A further improvement within the present invention concerns the handlebars. Most bicycles and many motor-cycles afford no or scanty suspension to the handlebars in relation to the seat of the vehicle. Therefore, while the passenger or driver may find himself or herself comfortably seated, front wheel shocks, particularly if strong and/or repetitive may be hard on the upper members of the driver. The present invention may also provide suspension for the handlebar with the same suspension device S used for the seat. As show in FIG. 4, rather than conventionally affix the handlebars 41 to the front fork 37, the handlebar 41 is supported in a housing 43 forming part of or rigidly attached to the frame member 11. Thus, the frame member 11, the seat and the handlebars 41 form a load system L for the suspension system of FIG. 1. Means, such as a hinged member (not illustrated) allowing relative axial movement between the handlebars 41 and the front fork 37, may connect the handlebar axle to the front fork, to enable the front wheel to turn sideways together with the handlebar.

Another improvement within the invention is the provision of means to adapt the same cycle suspension for both uphill and downhill. Heretofore, different competiton bicycles and motor-cycles are used for uphill and downhill, since a substantially stiffer suspension is effective in one case but countereffective in the other. The suspension of the invention embodied in the cycle of FIG. 4 may be stiffened but tightening the central pivot 21, for instance, thereby holding the central swing-arm 23 fast against the frame member 11. To adapt to greater suspension requirements, the central pivot may be loosened to enable the common swing-arm 23 to travel up and down the common swing-arm 23 and tilt in relation thereto.

Figure 5A:
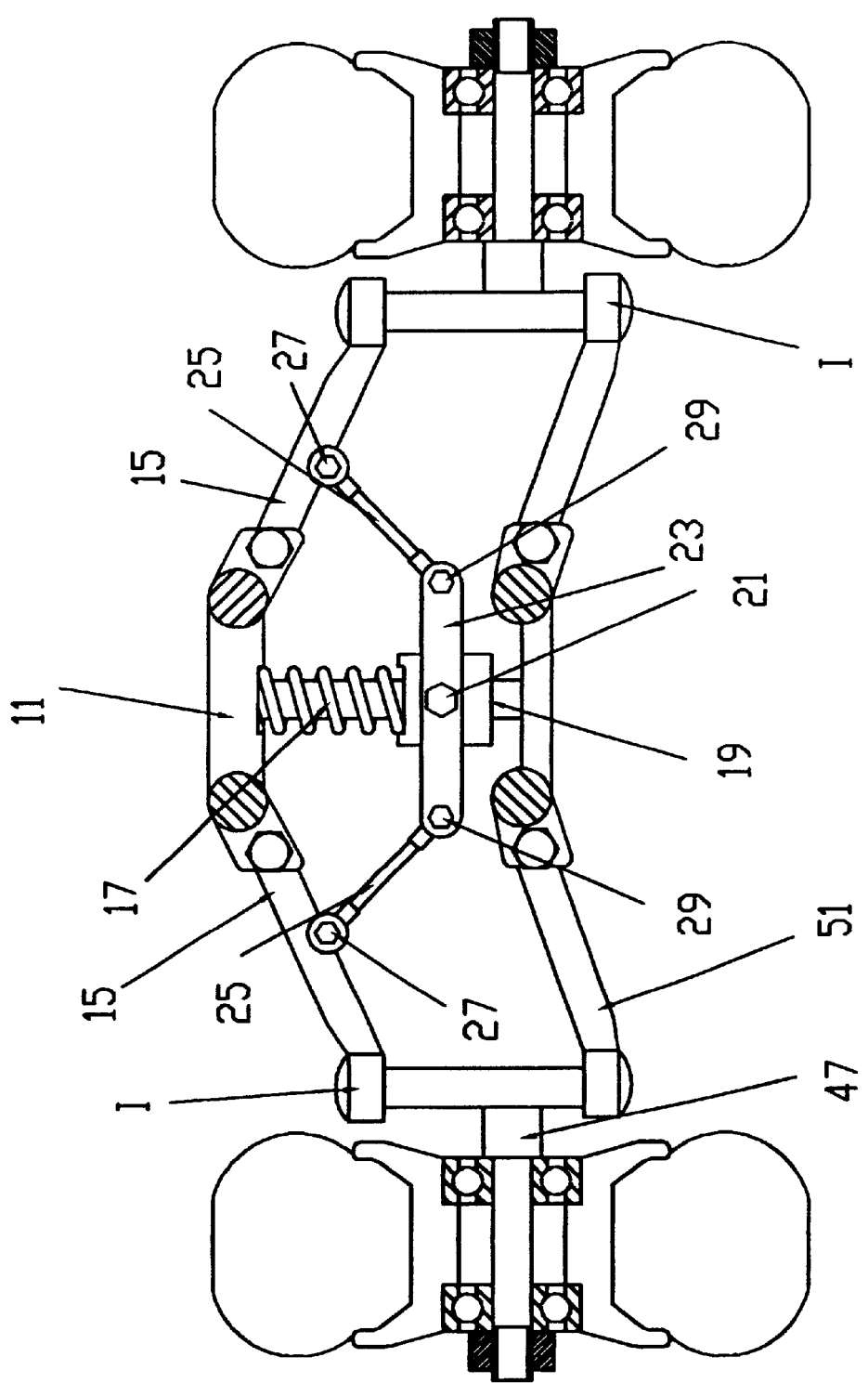
FIGS. 5A and 5B are a schematic representaton and a perspective view of a suspension system similar to FIG. 3 adapted to the rear suspension of a automobile or a truck.
Figure 5B:
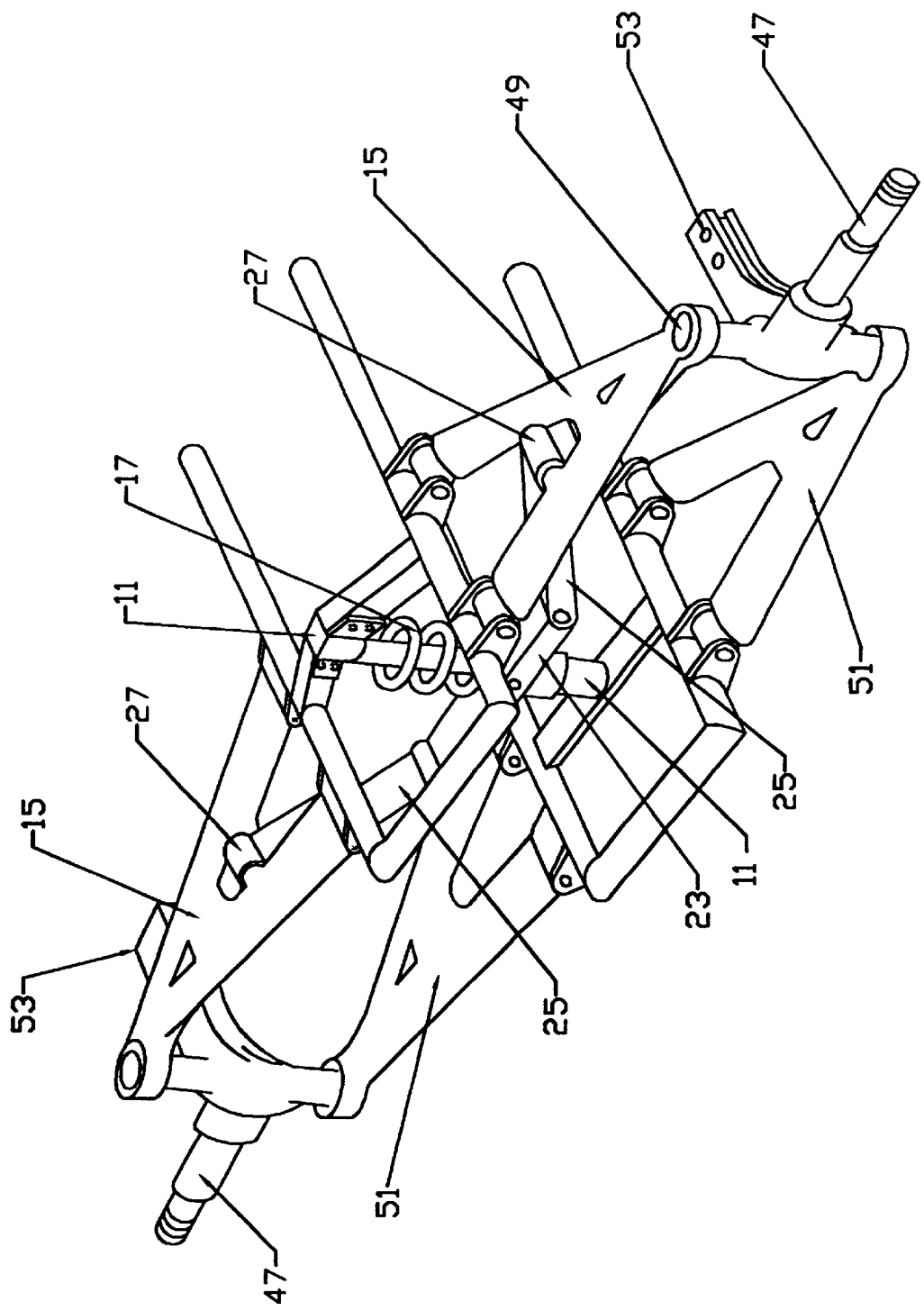

FIGS. 5A–5B illustrate an embodiment of the invention applied to a four-wheel vehicle, such as a buggy. To avoid repetitons and obvious deductions on the preceding disclosure herein, only the relevant portions of this embodiment are described hereafter. The essential structure of the suspension system employed is that of the embodiment of FIG. 3.

The vehicle comprises a chassis 11 formed by a tubular structure for supporting the load. The end bars 47 receive the inputs from the wheels and are articulated at joints 49 on the ends of upper and lower bars 15 and 51 which form a parallelogramme structure. Means 53 may be provided for turning the wheel direction. The chassis is provided with the central frame member 11 formng part thereof and mounting the slider 19 and the common swing-arm 23 by means of the latter. Bars 25 embodying the link-arms are provided between the top bar structure 15 and the swing-arm 23.

In the case of a automobile, a similar structure may be adapted further including shock absorber means.

Although the present invention has been disclosed in detail in connection with preferred embodiments and specific applications of a suspension system, different modifications in construction, materials, mounting, operation and applications may appear to those skilled in the art without departing from the purview of the claims appended hereto.

We claim:

1. A suspension system comprising:
    two separate input nodes adapted for receiving external mechanical movement disturbance;
    a suspension device having a first side for attachment to a frame member and a common second side;
    means for coupling each of said input nodes to said frame member; and
    means for linking each of said input nodes to said common second side of said suspension device such that external disturbance applied to any one of said input nodes is transferred by said coupling means substantially to said suspension device in relation to the other of said input nodes and independently of external disturbance applied to said other input node;
    and wherein:
        said coupling means comprises:
            a first input swing-arm and a second input swing-arm, each of said input swing-arms pivotably connecting one of said nodes to said frame member; and
        said linkage means comprises:
            a slider mounted via a sliding connection to said frame member and attached to said suspension device second side;
            a common swing-arm mounted to said slider by means of a pivot connection;
            a first link arm and a second link arm, each of said link arms pivotably connecting one of said nodes to said common swing-arm on opposite ends thereof in relation to said slider, each of said link arms being in a further pivotable relationship with a corresponding one of said input swing-arms;
    whereby external disturbance applied to one of said nodes displaces the end of said common swing-arm connected to the corresponding link arm such that said common swing-arm end substantially pivots about the opposite one of said common swing-arm end, thereby transferring said external disturbance substantially to said suspension device.

2. The suspension system of claim 1, wherein said suspension device includes at least one spring means for urging said coupling means to a system restoration position.

3. The suspension system of claim 2, wherein said suspension device further comprises a shock absorber arranged in combination with said at least one spring means for resisting relative movement between said frame member and said linkage means in response to external disturbance driving any one or both of said input nodes.

4. The suspension system of claim 1, wherein said first input swing-arm has a length substantially different to said second input swing-arm.

5. The suspension system of claim 1, wherein said link arms are arranged, in relation to the corresponding pivot connections thereof to said respective input swing-arms and common swing arm, such that said common swing-arm is driven towards an alignment relationship with one of said link arms in response to a positive external disturbance appearing at the input node associated to said link arm.

6. The suspension system of claim 5, wherein said common swing-arm is intermediate said suspension device and said input swing-arms and each link arm is pivotably connected to said common swing-arm on the opposite side of its corresponding input node pivot connection in relation to said frame member.

7. The suspension system of claim 5, wherein said common swing-arm is opposite said suspension device relative to the pivot connections between said input swing-arms and said frame member such that each link arm is pivotably connected to said common swing-arm on a same side of its corresponding input node pivot connection in relation to said frame member.

8. The suspension system of claim 1, wherein the pivot connections of both said input swing-arms to said frame member comprises a single triple-pivot connection.

9. The suspension system of claim 1, wherein a first one of said input swing-arms is directly pivot-connected to said frame member and a second one of said input swing-arms is pivot-connected to the first input swing-arm.

10. The suspension system of claim 1, wherein said link arms have substantially the same length.

11. The suspension system of claim 1, wherein said input swing-arms have substantially the same length.

12. The suspension system of claim 1, wherein said first link arm has a length substantially different to said second link arm.

13. A vehicle having a first wheel and a second wheel for transporting said vehicle along a surface, said vehicle further including the suspension system of claim 1 wherein a first one of said two nodes is driven by said first wheel and a second one of said nodes is driven by said second wheel.

14. The vehicle of claim 13, wherein said vehicle is a two-wheel cycle including a seat coupled to said frame member.

15. The vehicle of claim 14, wherein said vehicle further includes a handlebar supported by said frame member.

16. The vehicle of claim 13, said vehicle including a pair of front wheels and a pair of back wheels, wherein said vehicle comprises at least one of the following suspension systems:
   a front suspension system coupled to said pair of front wheels at said input nodes;
   a rear suspension system coupled to said pair of back wheels at said input nodes;
   a left suspension system coupled to the front wheel and back wheel on the right-hand side of the vehicle at said input nodes; and
   a right suspension system coupled to the front wheel and back wheel on the left-hand side of the vehicle at said input nodes.

17. The vehicle claim 13, said vehicle includes a plurality of axles, each axle for mounting at least one wheel to each of opposite ends thereof, wherein said vehicle comprises one said suspension system integrated on at least some of said axles.

18. A vehicle including:
   a front wheel having an axle mounted to a front fork of the vehicle,
   a back wheel having an axle mounted to a rear fork of the vehicle,
   a handlebar rotationally coupled to said front wheel for turning said front fork,
   a suspension device including a frame side, a common input side and common resilient component coupling said frame side and input side,
   a seat adapted for a person to sit on and direct said handlebar, said seat coupled to a frame member,
   said frame member attached to said frame side of the suspension device and extending generally vertically between said wheel axles,
   an input means for pivotably coupling each of said front and rear forks to said frame member, and
   linkage means independently coupling said front and rear wheel axles to said common input side of said suspension device, said linkage means comprises a slider attached to said input side of said suspension device and slidably mounted to said frame member.

19. The vehicle of claim 18, wherein said linkage means further comprises:
   a central swing-arm having a front end and a back end and pivotably connected to said slider intermediate said arm front and back ends thereof;
   a front input swing-arm having a front end connected to said front fork and a back end pivotably connected to said frame member downward from said slider;
   a rear input swing-arm comprising said rear fork and including a front end pivotably connected to said frame member downward from said slider;
   a first link arm having a front end pivotably connected to said front swing-arm and a back end pivotably connected to said central swing-arm back end; and
   a second link arm having a back end pivotably connected to said back fork and a front end pivotably connected to said central swing-arm front end;
   whereby an external force positively applied to said front wheel causes said swing-arm to rotate about said slider in a predetermined direction and drive said suspension device without transfering substantially any movement to the second link arm or the rear input swing-arm
   whereas an external force positively applied to said rear wheel causes said swing-arm to rotate about said slider in a direction opposite to said predetermined direction and drive said suspension device without transferring substantially any movement to the first link arm or the front input swing-arm.

20. The vehicle of claim 19, wherein said front input swing-arm is directly pivot-connected to said frame member and said rear input swing-arm is pivot-connected to the front input swing-arm.

21. The vehicle of claim 19, wherein said central swing-arm further includes selective suspension stiffening means for selectively fastening said slider on said frame member and link arms on said slider, thereby avoiding sliding and rotational motion of said central swing arm relative to said frame member.

* * * * *